(12) United States Patent
Hickman

(10) Patent No.: US 8,374,421 B1
(45) Date of Patent: Feb. 12, 2013

(54) METHODS AND SYSTEMS FOR EXTRACTING STILL FRAMES FROM A COMPRESSED VIDEO

(75) Inventor: Ryan Hickman, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/276,049

(22) Filed: Oct. 18, 2011

(51) Int. Cl.
| G06K 9/00 | (2006.01) |
| G06F 19/00 | (2011.01) |
| G05B 19/18 | (2006.01) |
| G05B 11/18 | (2006.01) |
| H04N 7/00 | (2011.01) |
| H04N 7/18 | (2006.01) |
| B25J 5/00 | (2006.01) |

(52) U.S. Cl. ........ 382/153; 700/245; 700/250; 700/253; 318/568.12; 318/592; 348/113; 348/114; 901/6; 901/8

(58) Field of Classification Search .................. None
See application file for complete search history.

(56) References Cited

U.S. PATENT DOCUMENTS

| 6,708,081 | B2 * | 3/2004 | Yoshida .................. 700/245 |
| 7,477,285 | B1 * | 1/2009 | Johnson .................. 348/143 |
| 7,899,243 | B2 | 3/2011 | Boncyk et al. |
| 7,966,005 | B2 | 6/2011 | Kondo et al. |
| 2004/0017937 | A1 * | 1/2004 | Silverstein .................. 382/153 |
| 2007/0024706 | A1 * | 2/2007 | Brannon et al. .............. 348/142 |
| 2007/0140527 | A1 * | 6/2007 | Yamamoto et al. ........... 382/104 |
| 2008/0024596 | A1 * | 1/2008 | Li et al. .......................... 348/47 |
| 2008/0025387 | A1 * | 1/2008 | Lim et al. .................. 375/240.01 |
| 2011/0054689 | A1 * | 3/2011 | Nielsen et al. ................ 700/258 |
| 2011/0091096 | A1 * | 4/2011 | Morris et al. ................. 382/154 |
| 2011/0143811 | A1 | 6/2011 | Rodriguez |
| 2011/0172822 | A1 * | 7/2011 | Ziegler et al. ................. 700/259 |

OTHER PUBLICATIONS www.wikipedia.org, "Transmission Control Protocol", 2008, [online] downloaded from http://web.archive.org/web/20081003153925/http://en.wikipedia.org/wiki/Transmission_Control_Protocol on Mar. 21, 2012, pp. 1-12.*
A survey on wireless multimedia sensor networks, I.F. Akyildiz et al., Computer Networks 51 (2007) 921-960.
A Tele-operated Gesture Recognition Mobile Robot using a Stereo Vision, H.C. Shin et al., Proceedings of the 17th World Congress, The International Federation of Automatic Control, Seoul, Korea, Jul. 6-11, 2008.

* cited by examiner

*Primary Examiner* — Andrew W Johns
*Assistant Examiner* — David F Dunphy
(74) *Attorney, Agent, or Firm* — McDonnell Boehnen Hulbert & Berghoff LLP

(57) ABSTRACT

Methods and systems for robot and cloud communication are described. A robot may interact with the cloud to perform any number of actions using video captured from a point-of-view or in the vicinity of the robot. The cloud may be configured to extract still frames from compressed video received from the robot at a frame rate determined based on a number of factors, including the robot's surrounding environment, the available bandwidth, or actions being performed. The cloud may be configured to request that a compressed video with higher frame rate be sent so that the cloud can extract still frames at a higher frame rate. Further, the cloud may be configured to request that a second compressed video from a second perspective be sent to provide additional environment information.

19 Claims, 6 Drawing Sheets

METHODS AND SYSTEMS FOR EXTRACTING STILL FRAMES FROM A COMPRESSED VIDEO

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software that collect commands from the user and interpret the commands into commands on the servers. The servers may handle the computing, and can either store or retrieve information from database servers or file servers and display an updated page to the user. Through "cloud computing", data across multiple servers can be synchronized around the world allowing for collaborative work on one file or project, from multiple users around the world, for example.

SUMMARY

This disclosure may disclose, inter alia, methods and systems for robot cloud computing.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In yet further examples, any type of devices may be used or configured as means for performing functions of any of the methods described herein (or any portions of the methods described herein).

In one example, a method is provided that comprises receiving a compressed video from a robotic device, the compressed video captured by a video capturing device attached to the robotic device, determining, by a computing system having a processor and a memory, a frame rate at which to extract still frames from the compressed video based on whether the robotic device has previously traversed an environment of the robotic device, and extracting still frames from the compressed video at the determined frame rate.

In another example, a non-transitory computer readable medium with instructions stored thereon is provided. The instructions may be executable by a computing device to cause the computing device to perform functions. The functions comprise receiving a compressed video from a robotic device, determining a frame rate at which to extract still frames from the compressed video based on an environment of the robotic device, and extracting still frames from the compressed video at the frame rate.

In yet another example, a device is provided. The device includes a processor and memory. The memory includes instructions stored therein executable by the processor to perform functions. The performed functions comprise receiving a compressed video from a robotic device, determining a frame rate at which to extract still frames from the compressed video based on an environment of the robotic device, and extracting still frames from the compressed video at the frame rate.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

In the Figures.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for robot cloud computing. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from robot depending on requirements. In some examples, a robot may be configured to receive a second device, such as mobile phone, that may be configured to function as an accessory or a "brain" of the robot.

In examples described herein, a robot may interact with the cloud to perform any number of actions, such as to share information with other cloud computing devices. Within examples, a robot may interact with the cloud to facilitate object recognition, to perform a mapping function, or to perform navigational functions (i.e., receive a map/navigation pathway previously traversed by another robot). In other examples, a robot may interact with the cloud to perform mapping of objects in an area, to perform inventory of objects, and to perform voice recognition/control by a robot. A robot may perform any actions or queries to the cloud as described herein based on contextual or situational information.

1. Cloud Computing Architecture

Figure 1:
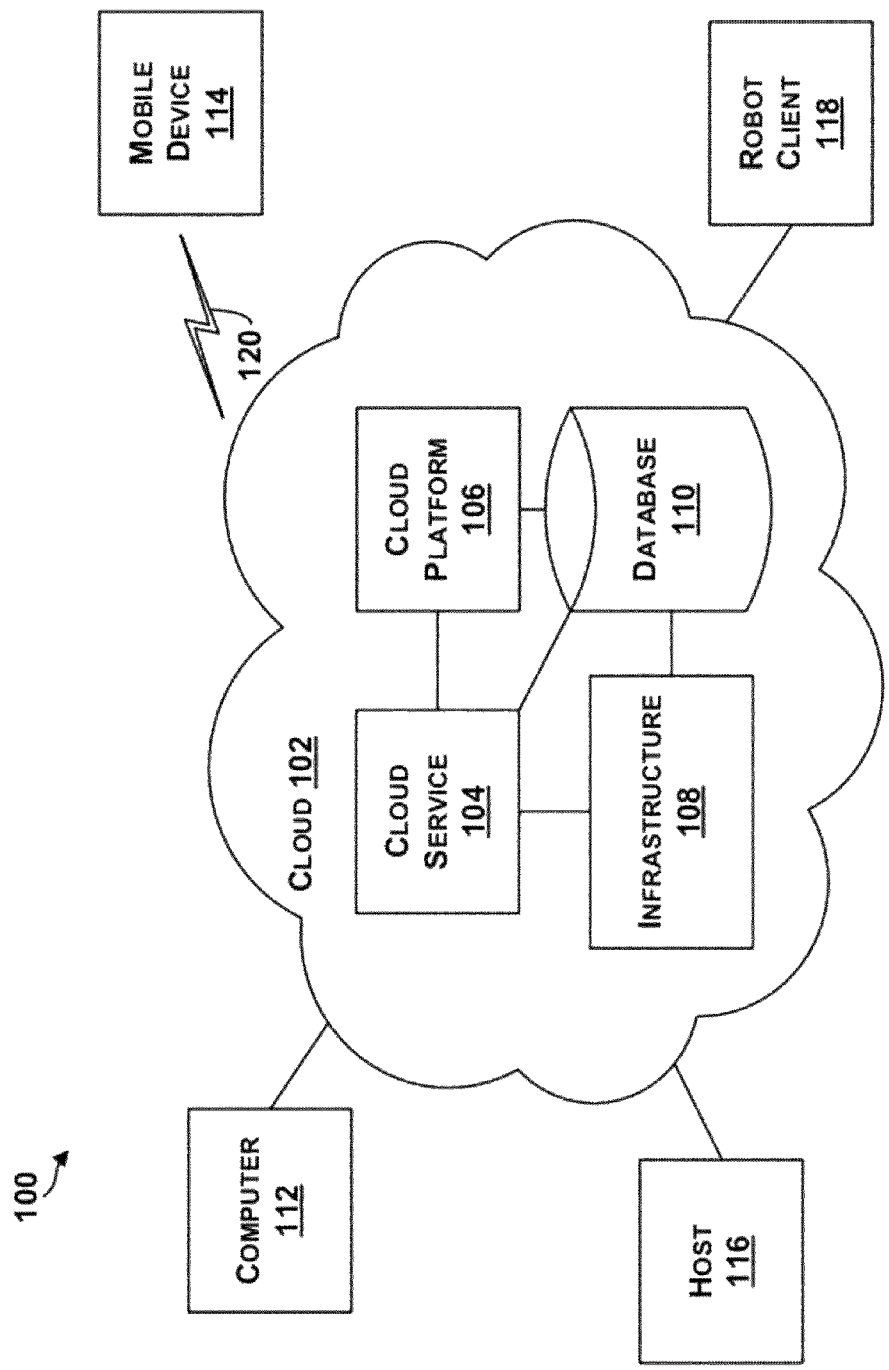
FIG. 1 is an example system for cloud-based computing.

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more of fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device or transmitter including a laptop computer, a mobile telephone, etc., that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

2. Example Robot Architecture

Figure 2A:
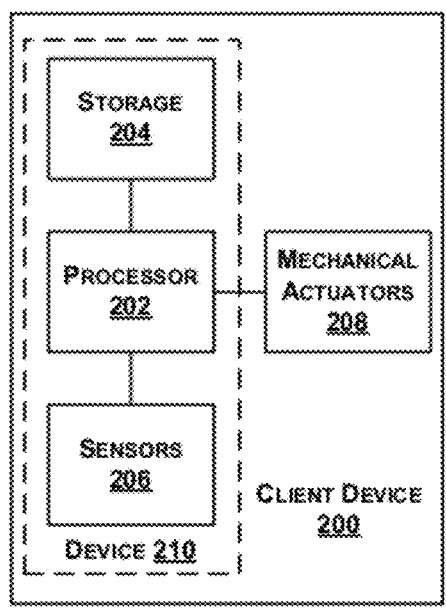
FIG. 2A illustrates an example client device.

FIG. 2A illustrates an example client device 200. In one example, the client device 200 is configured as a robot. In some examples, a robot may contain computer hardware, such as a processor 202, memory or storage 204, and sensors 206. For example, a robot controller (e.g., processor 202, computing system, and sensors 206) may all be custom designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot. Example sensors may include, smoke sensors, light sensors, radio sensors, infrared sensors, microphones, speakers, gyroscope, accelerometer, a camera, radar, capacitive sensors and touch sensors, etc.

The client device 200 may also have components or devices that allow the client device 200 to interact with its environment. For example, the client device 200 may have mechanical actuators 208, such as motors, wheels, movable arms, etc., that enable the client device 200 to move or interact with the environment.

In some example, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some example, the client device 200 may be configured to receive a device, such as device 210, that includes the processor 202, the storage 204, and the sensors 206. For example, the client device 200 may be a robot that have a number of mechanical actuators (e.g., a movable base), and the robot may be configured to receive a mobile telephone to function as the "brains" or control components of the robot. The device 210 may be considered a module of the robot. The device 210 may be physically attached to the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone), which can provide additional peripheral components to the device 200, such as any of an accelerometer, gyroscope, compass, GPS, camera, WiFi connection, a touch screen, etc., that are included within the device 210.

Figure 2B:
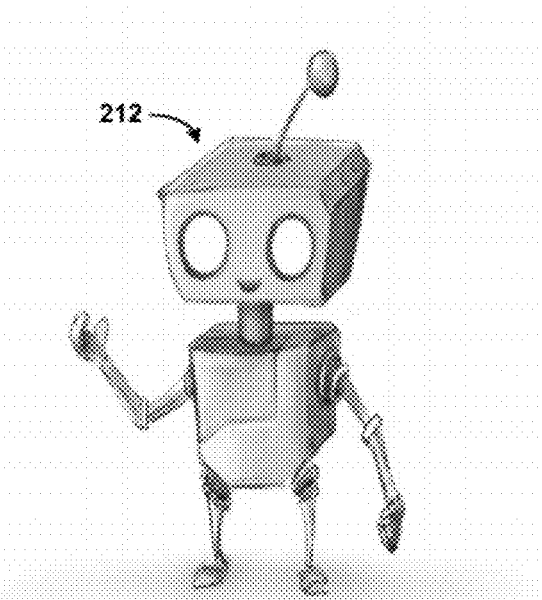
FIG. 2B illustrates a graphical example of a robot.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

Figure 2C:
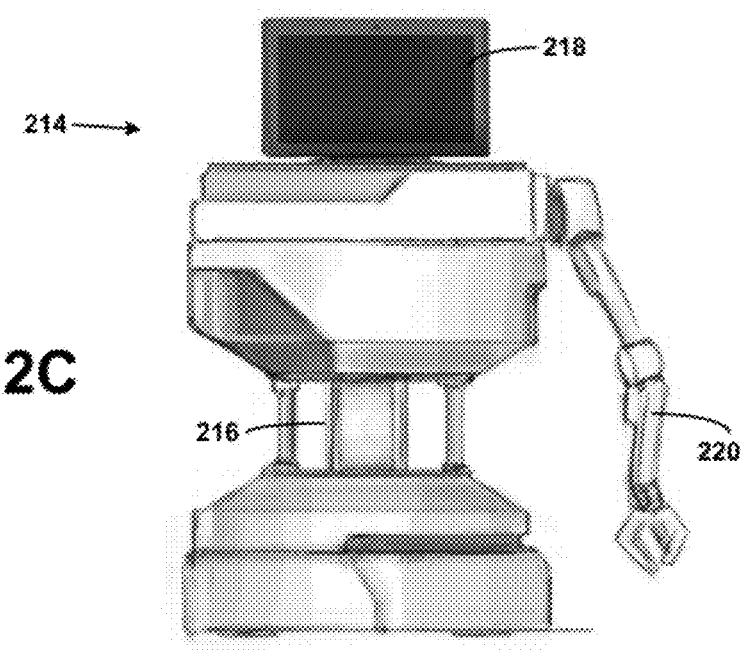
FIG. 2C illustrates another example of a robot.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

3. Robot and Cloud Interaction

Figure 3:
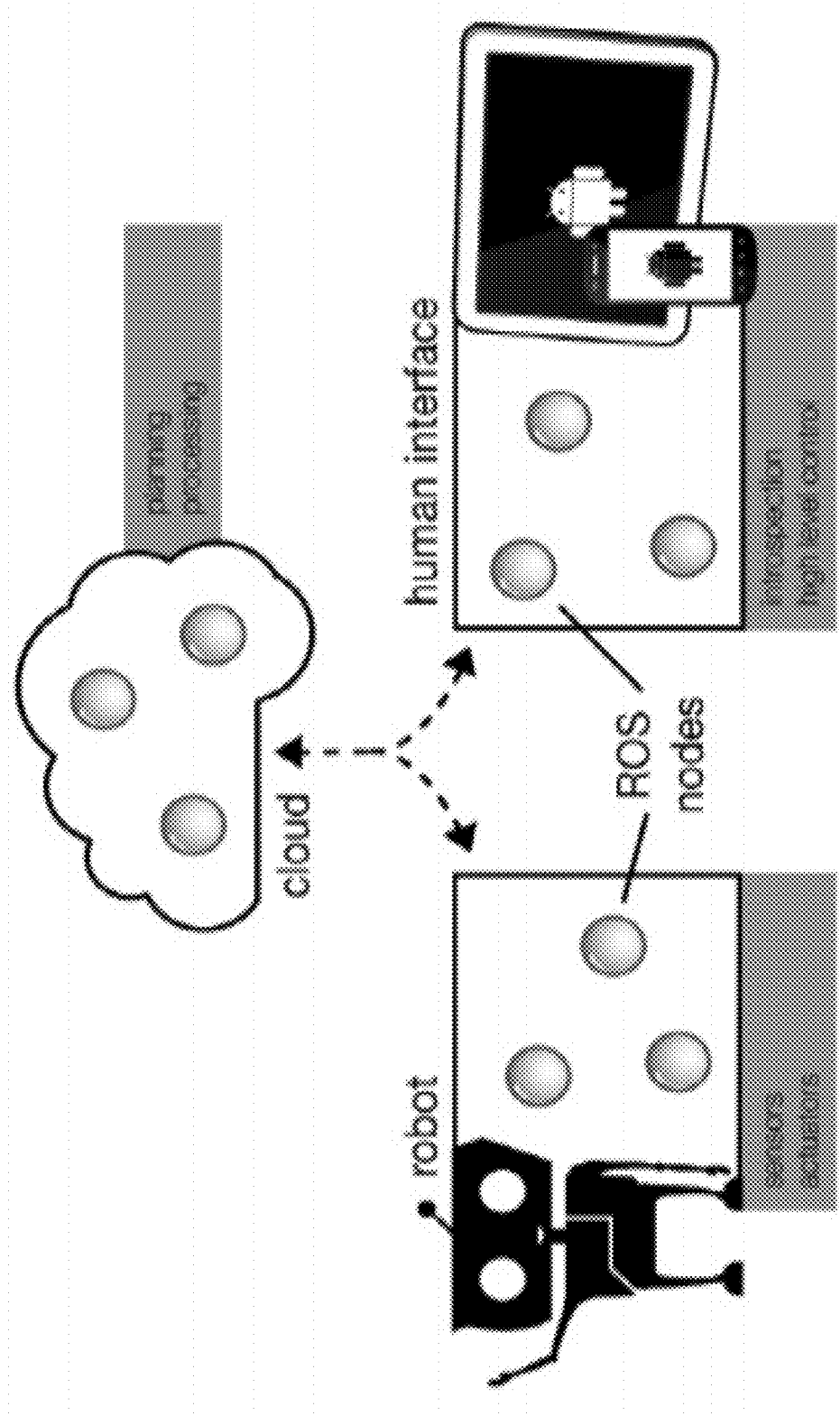
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example the robot may receive data from the cloud. The data received from the cloud may be in many different forms. The received data may be a processed form of data the robot sent to the cloud. The received data may also come from sources other than the robot. For example, the cloud may have access to other sensors, other robots, and the internet.

Figure 4:
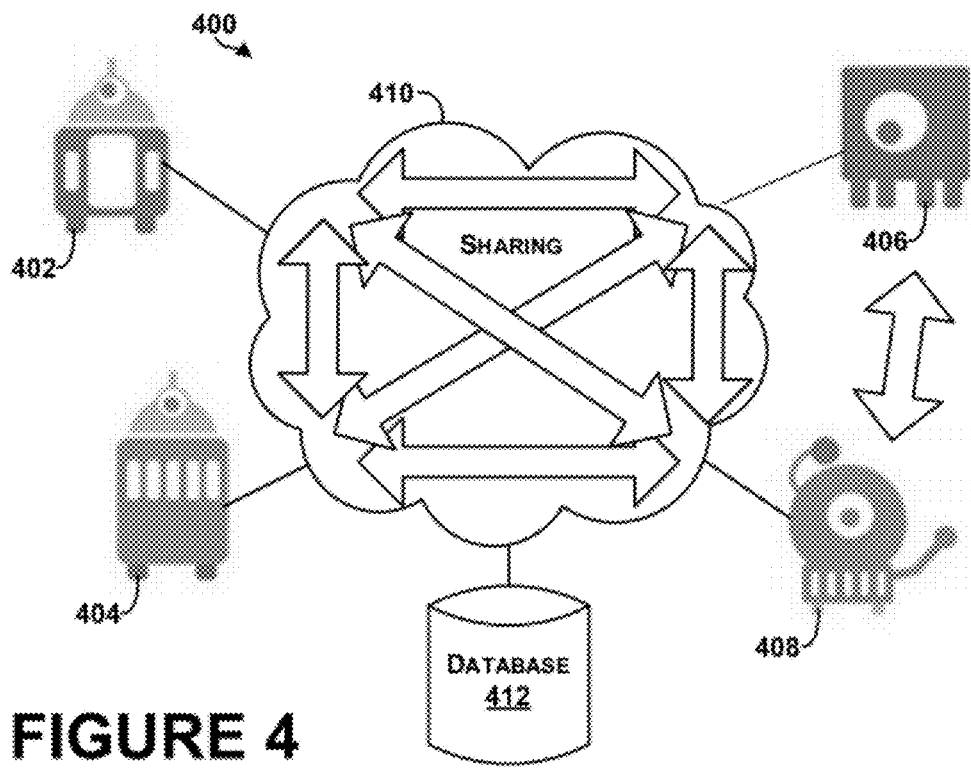
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program on the cloud 410 may be configured to identify the object in the picture and provide data to all the robots connected to the cloud 410 about the recognized object, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions with an area, people, other robots, etc. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. For example, the robot 402 may traverse a pathway and encounter an obstacle, and can inform the other robots 404, 406, and 408 (through the cloud 410) of a location of the obstacle. Each robot 402, 404, 406, and 408 will have access to real-time up to date data. In another example, the robot 404 can download data indicating images seen by the other robots 402, 406, and 408 to help the robot 404 identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, mapping of a physical location, such as providing data regarding a history of where a robot has been, can be provided. Another number or type of indicators may be recorded to facilitate mapping/navigational functionality of the robots 402, 404, 406, and 408 (e.g., a scuff mark on a wall can be one of many cues that a robot may record and then rely upon later to orient itself).

In one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, etc., any detail that may be associated with the object) that can be accessed by the robots 402, 404, 406, and 408 to perform object recognition. As an example, information regarding use of an object can include, e.g., such as for a phone, how to pick up a handset, how to answer the phone, location of buttons, how to dial, etc.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model, etc.). Each object may include information in the database 412 including an object name, object details, object distinguishing characteristics, etc., or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a computer), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and builds a map of an area, and then the robot can upload the data to the cloud 410 to share this knowledge with all other robots. In this example, a transportation of the given robot's "consciousness" can be made through the cloud 410 from one robot to another (e.g., robot "Bob" builds a map, and the knowledge of "Bob" can be downloaded onto another robot to receive knowledge of the map).

Thus, within examples, the robots 402, 404, 406, and 408 may share information through the cloud 410, and may access the database 412.

4. Robot and Cloud Video Transmission

As mentioned, the robot may send data to a cloud for data processing, and the cloud may process the data to complete tasks, such as determining a location of a robot, recognize objects, map a local environment, or navigate a robot through an environment, for example. To perform these functions, the data sent to the cloud for data processing may often include video. To perform functions in real-time, the cloud can be configured to receive and process the video information.

Figure 5:
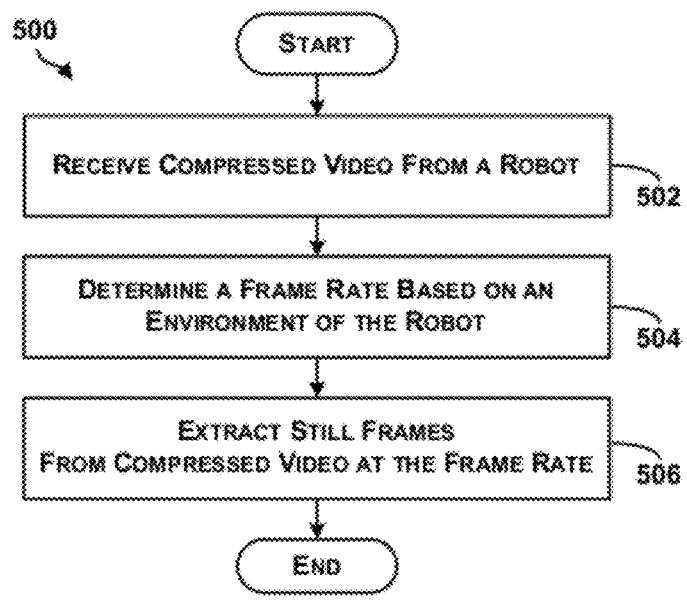
FIG. 5 is a block diagram of an example method of a robot interaction with the cloud to facilitate video data processing by extracting still frames from a received compressed video.

FIG. 5 is a block diagram of an example method of a robot interaction with the cloud to facilitate video data processing, in accordance with at least some embodiments described herein. Method 500 shown in FIG. 5 presents an embodiment of a method that could be used with the systems 100 and 400 for example, and may be performed by a device, such as other devices illustrated in FIGS. 1-4, or components of the device. Method 500 may include one or more operations, functions, or actions as illustrated by one or more of blocks 502-506. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

At block 502, the method 500 includes receive compressed video. In an example, the cloud receives a compressed video from a robot. The compressed video may be captured by a video capturing device on the robot providing video footage from a point of view of the robot. The compressed video may also be captured by a video capturing device in the vicinity of, but not necessarily attached to the robot, providing a view of an area near the robot, which may also include a view of the robot. When a video is captured, the video is captured at a video capture frame rate, which can be measured in units of frames per second (fps). The video capture frame rate may be adjustable and may depend on the video capturing device.

In another example, the compressed video may be received in the form of a stream of video from the robot. When a video is received in the form of a stream of video, video content of the received video may be continuously received by an end-user, while being delivered from the source, which in this case, may be the robot.

In some examples, video may be captured by the robot, compressed into a compressed form, and then provided to a server on a network in the cloud. In other examples, video may be captured in a compressed format.

At block 504, the method 500 includes determine a frame rate based on an environment of the robot. The determined frame rate may be used as a frame rate at which still frames may be extracted from the received compressed video. The still frames may be extracted for various tasks, such as object recognition or geographic mapping of the surrounding environment, for example. In an example in which still frames are used for navigation by the robot, the cloud may determine that extracting still frames at a decreased frame rate is sufficient for an environment the robot has previously traversed and for which the cloud has information on. In another example in which the still frames are used for navigation by the robot, the cloud may determine that extracting still frames at an increased frame rate is beneficial for an environment the robot has not previously traversed and for which the cloud has no information on. In this instance, the increased frame rate may yield additional environment information which may be useful for navigation by the robotic device. In these cases, device information associated with the robot may also be received, indicating whether the robot has previously traversed the environment of the robot.

In an example in which the cloud determines that still frames from the compressed video should be extracted at a higher frame rate than the video capture frame rate of the received compressed video, the cloud may send a message to the robot indicating a frame rate at which the robot should capture and send the compressed video.

In a specific example, the video capture frame rate of a compressed video captured by the robot and received by the cloud may be about 24 fps. If the cloud determines that the robot is in an environment the robot has previously traversed and for which the cloud has information on, the cloud may extract still frames from the received compressed video at a lower frame rate of about 2 fps. If the cloud determines that the robot is in an environment the robot has not previously traversed and for which the cloud has no information on, the cloud may extract still frames from the received compressed video at a frame rate of about 24 fps, which may be the same frame rate at which the compressed video was captured. If the cloud determines that the robot is in an environment the robot has not previously traversed and for which the cloud has no information on, and that an even higher frame rate can be useful to acquire information for navigation by the robot, the cloud may send a message to the robot requesting the robot to capture and send the compressed video at a higher frame rate, such as about 36 fps.

In another example, the extracted still frames can be processed to perform the task of object recognition. In this instance, if the cloud is unable to successfully recognize an object by processing the extracted still frames, the result of the object recognition task is inconclusive. In the case that the result of the object recognition is inconclusive, the cloud may determine that still frames should be extracted at a higher frame rate. In this case, if the video capture frame rate of the received compressed video is lower than the determined higher frame rate at which to extract still frames, a compressed video having a higher frame rate is needed. Accordingly, the cloud may send a message to the robot requesting the robot to provide a compressed video with a video capture frame rate at least as high as the determined higher frame rate.

At block 506, the method 500 includes extract still frames from the compressed video at the frame rate. Once a frame rate has been determined based on the environment of the robot, still frames may be extracted from the received compressed video at the determined frame rate. As discussed above, the extracted still frames may then be utilized for the robot to perform various tasks, such as object recognition or geographic mapping of the surrounding environment.

In one example, the received compressed video may first be decompressed, after which the still frames are extracted from the decompressed video. In another example, the still frames may be extracted directly from the received compressed video. As discussed above, the still frames may be extracted from the compressed video at the video capture frame rate of the compressed video, or at a frame rate less than the video capture frame rate of the compressed video.

In a further example, still frames may be extracted from a compressed video by saving still frames from the compressed video, and the frame rate at which the still frames are extracted determines which still frames from the compressed video are saved. For instance, if the still frames are extracted from the compressed video at the video capture frame rate of the compressed video, every frame of the compressed video is saved. On the other hand, if the still frames are extracted from the compressed video at a frame rate which is half of the video capture frame rate, every other frame of the compressed video is saved.

Extracting still frames from the received compressed video rather than receiving still frames extracted from a captured video at a predetermined frame rate allows the cloud to scale processing requirements. For example, if the cloud determines that a lower extraction frame rate is appropriate, the cloud can extract still frames from the received compressed video at a lower rate, thereby consuming less processing power. The saved processing power may then be applied towards other cloud computing applications, for example.

In addition to the frame rate, the cloud may also determine that a higher resolution video is needed and may request the robot to capture the video at a higher resolution. On the other hand, the cloud may also determine that a lower resolution video is sufficient and accordingly may send a message to the robot indicating to capture the video at the lower resolution.

In another example, the cloud may determine that a monochromatic video is appropriate for a given task, and accordingly may send a message to the robot indicating to provide a monochromatic video. On the other hand, if additional color video information is needed, the cloud can send a message to the robot requesting multi-chromatic video. The cloud may further send a message to the robot requesting specific chromatic qualities, such as color contrast for example. In other examples, the cloud may also request a number of frames in color (e.g., every other frame of the compressed video in color), and the remaining frames be monochromatic.

As mentioned above, the compressed video may be captured by a video capturing device in the vicinity of the robot. In one example, a second computing device may have received a compressed video captured by the video capturing device in the vicinity of the robot. In this instance, the cloud can access the compressed video received by the second computing device to extract information for the various applications mentioned above. In a further example, the second computing device may be a part of the network of servers and computing devices constituting the cloud.

In an example, a user may be participating in an internet video chat facilitated by a user device. To facilitate the internet video chat, the user device captures video content associated with real-time interactions between the user and a remote party and sends the video content to a second computing device. If the user device facilitating the internet video chat is in the vicinity of the robot, the cloud may access the video content received at the second computing device and extract still frames from the accessed video content for processing and use for various applications of the robot. In another example, the video content received at the second computing device may be received as a stream of compressed video. In a further example, the user device used for facilitating the internet video chat may be a video capturing device attached to the robot.

In certain applications, additional information from a second compressed video may be required or helpful. In an example of a robot having the task of navigating through a geographic landscape to reach a geographic object, the robot may have an attached video capturing device having a view of an area in front of the robot. In such a case, a second compressed video from a second video capturing device, if available, may further assist the robot in achieving the task. For example, if the second video capturing device is at a higher altitude, the second compressed video may have a view of an area at a greater distance in front of the robot and may provide additional information allowing the cloud to plan future maneuvers of the robot in advance.

Figure 6:
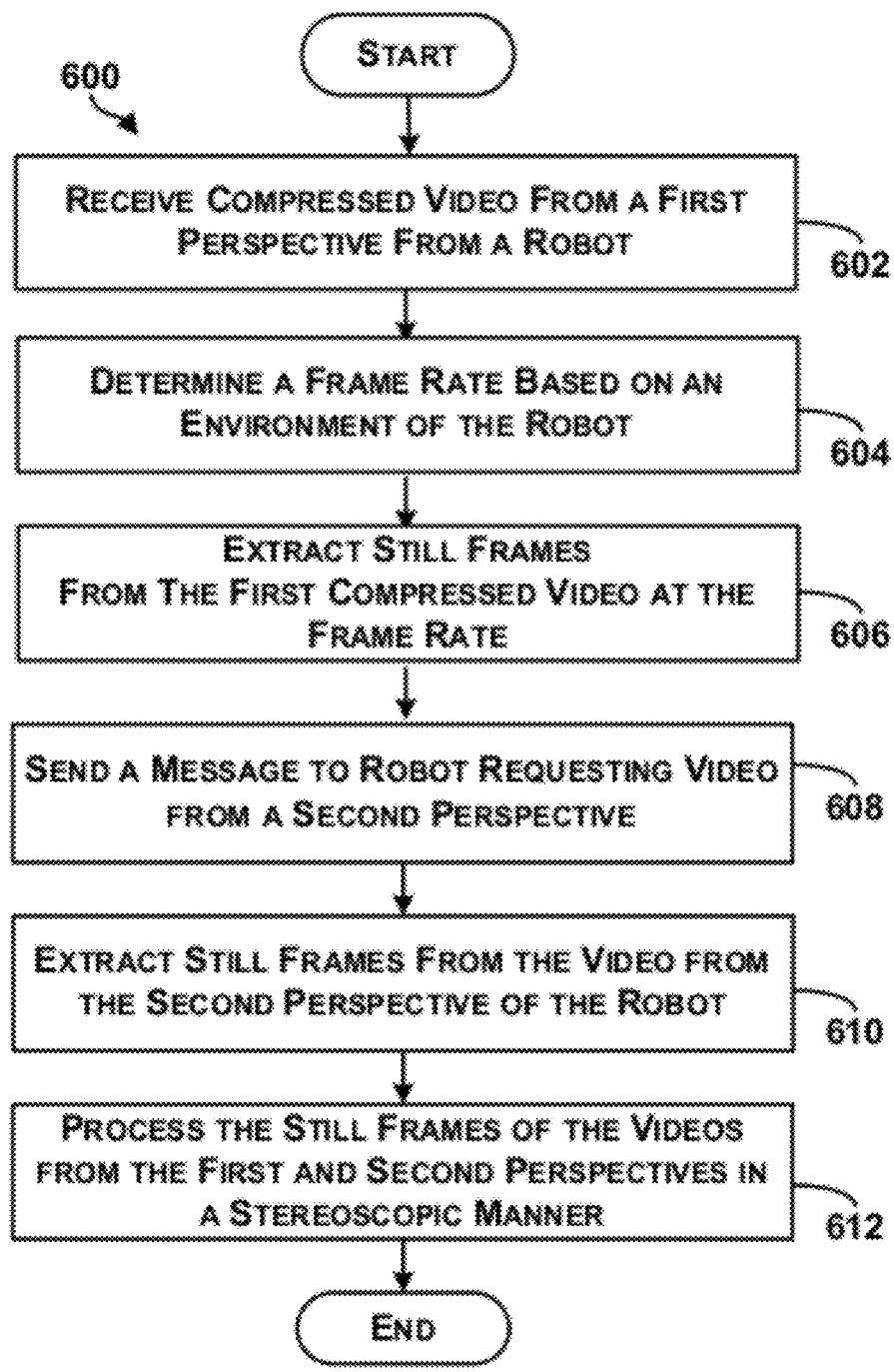
FIG. 6 is a block diagram of an example method of a robot interaction with the cloud to facilitate video data processing utilizing two compressed videos.

FIG. 6 is a block diagram of an example method 600 of a robot interaction with the cloud to facilitate video data processing utilizing two compressed videos, in accordance with at least some embodiments described herein. Method 600 presents an embodiment of a method that, for example, could be used with the systems 100 and 400, for example, and may be performed by a device, such as another devices illustrated in FIGS. 1-4, or components of the device. The various blocks of method 600 may be combined into fewer blocks, divided into additional blocks, and/or removed based upon the desired implementation.

At block 602, the method 600 includes receive compressed video from a first perspective from a robot. Similar to block 502 of the method 500, the compressed video may be captured by a video capturing device on the robot, providing video footage from a first perspective of the robot.

At block 604, the method 600 includes determine a frame rate based on an environment of the robot, similar to block 504 of method 500. At block 606, the method 600 includes extract still frames the frame rate, similar to block 506 of method 500.

At block 608, the method 600 includes send a message to the robot requesting video from a second perspective of the robot. In one example, the cloud determines that a single compressed video from a single point-of-view of the robot may be insufficient for the robot to perform a certain task and accordingly determines that a second compressed video from a second perspective of the robot is needed. In this instance, the cloud may send a message to the robot requesting a second compressed video. The second compressed video may be captured by a second video capturing device attached to the robot, or by a second video capturing device in the vicinity of the robot. The cloud may also access a second compressed video already being received at a second computing device, such as that of an internet video chat described previously.

At block 610, the method 600 includes extract still frames from the video from the second perspective of the robot. Similar to extracting still frames from the compressed video from the first perspective, the still frames may be extracted from the compressed video from a second perspective of the robot at the frame rate of the compressed video, or at a frame rate less than that of the compressed video.

At block 612, the method 600 includes process the still frames of the videos from the first and second perspectives in a stereoscopic manner. In one example, stereoscopic processing involves processing two images of an object from two different perspectives to acquire relative distance and depth information of the object. In the case the relative positions and orientations of the two positions from which the two images were captured are known, the object and the two positions may form three points of a triangle. In this instance, the relative distance and depth information of the object may be determined by processing the two images using triangulation or trilateration techniques according to the triangle.

In an example as applied to the method 600, the relative positions and orientations of the first and second video capturing devices are known. In this case, the still frames from the first and second perspectives may be stereoscopically processed by using the positions and orientation of the first and second video capturing devices to determine the distance or depth of an object found in still frames from both perspectives. By offering depth perceptions, stereoscopic information may assist in robot tasks such as navigating, mapping, as well as object recognition.

In the example of the robot having a task of navigating through a geographic landscape to reach a geographic objective, the robot may have a second video capturing device attached offering a second perspective of the area in front of the robot. Stereoscopically processing the frame stills from the first and second perspectives in this case may provide useful depth information on the area in front of the robot. In the case where the second video capturing device is at a higher altitude, stereoscopic processing may provide depth information indicating the distance of the area at a greater distance in front of the robot.

Figure 7:
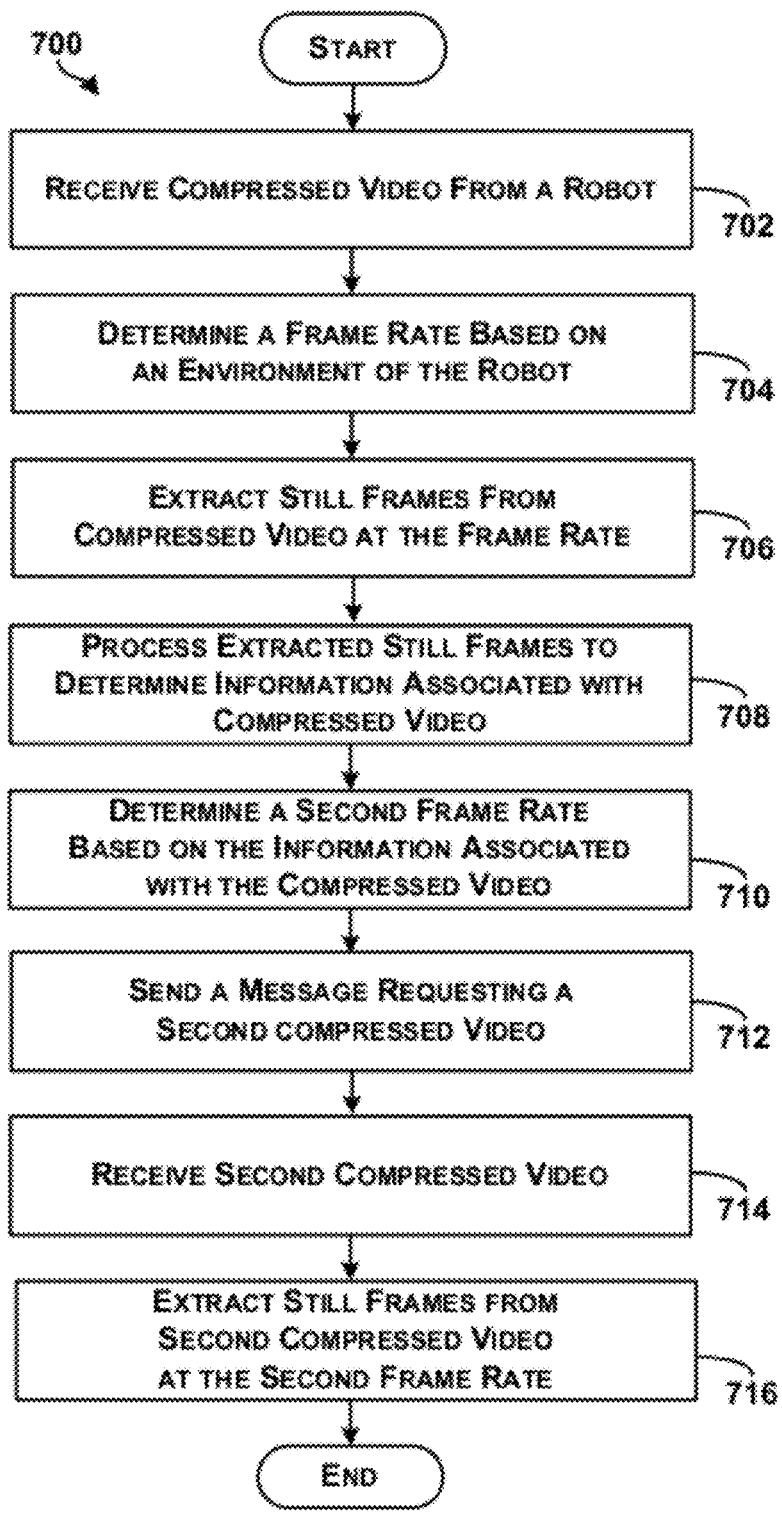
FIG. 7 is a block diagram of an example method of a robot interaction with the cloud to facilitate video data processing utilizing two compressed videos and extracting still frames from both compressed videos.

FIG. 7 is a block diagram of an example method 700 of a robot interaction with the cloud to facilitate video data processing utilizing two compressed videos and extracting still frames from both compressed videos, in accordance with at least some embodiments described herein. Method 700 presents an embodiment of a method that, for example, could be used with the systems 100 and 400, for example, and may be performed by a device, such as another devices illustrated in FIGS. 1-4, or components of the device. The various blocks of method 700 may be combined into fewer blocks, divided into additional blocks, and/or removed based upon the desired implementation.

At block 702, the method 700 includes receive compressed video from a robot, similar to block 502 of the method 500. At block 704, the method 700 includes determine a frame rate based on an environment of the robot, similar to block 504 of method 500. At block 706, the method 700 includes extract still frames the frame rate, similar to block 506 of method 500.

In block 708, the method 700 includes process extracted still frames to determine information associated with received compressed video. The determined information associated with the compressed video may include video information such as the resolution, compression standard, or frame rate. The determined information may also include video capturing device information associated with the device on which the compressed video was captured, such as a geographic location or capabilities of the video capturing device. The determined information may further include task-specific information, such as results from an object recognition task, or a mapping task. In one example, the task-specific information may indicate that processing of the extracted still frames from a single compressed video is not sufficient for performing a specified task, and that a second compressed video, from a second perspective may be required or helpful, as discusses above in reference to the method 600.

In block 710, the method 700 includes determine a second frame rate based on the information associated with the compressed video. For example, once the cloud has determined that a second compressed video may be required or helpful, the cloud may determine a second frame rate at which still frames from the second compressed video are to be extracted according to the determined information. The cloud may then send a message to the robot requesting the second compressed video.

In block 712, the method 700 includes send a message to the robot requesting a second compressed video. The message may further include a second frame rate at which the second compressed video is to be captured and sent at. The requested second compressed video may be captured by the same video capturing device used to capture the compressed video received at block 702. Alternatively, the requested second video may be captured by a different video capturing device than the one used to capture the compressed video received at block 702. In an example, the message sent to the robot may include a video capture frame rate at which the requested second compressed video is to be captured at.

In one example, the cloud may determine that the frame rate of the received compressed video is insufficient for recognizing an object, and determines a second frame rate based on the information associated with the compressed video, as described at blocks 708 and 710. In one instance, the robot and video capturing device may not have the capability to provide the second compressed video at the second frame rate. In this case, the cloud may request the robot to send the second compressed video at a highest/lowest frame rate the video capturing device and the robot are capable of providing.

In another example, the cloud may determine the second frame rate at which to request the second compressed video also based on the capabilities of the robot and video capturing device, in the case that the determined information includes information on the capabilities of the robot and video capturing device. In yet another example, the cloud may determine the frame rate of the second compressed video based on the availability of the bandwidth over which the second compressed video will be received.

In addition to the capabilities of the video capturing device, the capabilities of the robot may also comprise capabilities of various sensors attached to the robot. The cloud may receive sensor data associated with an array of sensors on the robot, and use the sensor data to help determine the frame rate of the second compressed video. The sensor data may provide information about the surrounding environment of the robot. In one example, the cloud may receive sensor data indicating that there is heavy rain where the robot is, and accordingly, the cloud may request a higher resolution compressed video or a compressed video with greater color contrast instead of extracting the still frames at a higher frame rate. The sensor data may also provide information on the operating condition of the robot. In one example, the cloud may receive sensor data indicating that the robot power level is low, and may not request a second compressed video at a higher frame rate.

In block 714, the method 700 includes receive second compressed video. After receiving the message requesting a second compressed video having the second frame rate, the robot can adjust the video capturing device to capture the second compressed video at the second frame rate and begin sending the second compressed video having the second frame rate for the cloud to receive. The frame rate of the second video may be the same or higher than the second frame rate.

In block 716, the method 700 includes extract still frames from second compressed video at the second frame rate. As the cloud receives the second compressed video, still frames may be extracted from the second compressed video at the second frame rate as determined based on the information associated with the compressed video. The still frames extracted from the second compressed video can then be processed to complete tasks, such as object recognition, and geographic mapping of the surrounding environment.

As discussed above, the cloud may determine the frame rate at which to extract still frames from the compressed video based on the objective, or task. For example, if the objective of the robot is to recognize an object, a higher frame rate may be requested than if the objective of the robot is to navigate through a door. In another example, if the objective of the robot is to navigate through the door at a fast speed, a higher frame rate may be requested than if the objective of the robot is to navigate through the door at a slower speed.

5. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses further describe aspects of the present description.

The invention claimed is:

1. A method comprising:
receiving a compressed video from a robotic device in an environment, the compressed video captured by a video capturing device attached to the robotic device;
determining, by a computing system having a processor and a memory, a frame rate at which to extract still frames from the compressed video based on device information associated with the robotic device, the device information indicating whether the robotic device has previously traversed the environment, wherein determining the frame rate based on device information indicating whether the robotic device has previously traversed the environment comprises determining a location of the robotic device; and
extracting still frames from the compressed video at the determined frame rate.

2. The method of claim 1, further comprising sending a message to the robotic device indicating the frame rate at which to send the compressed video.

3. The method of claim 1, further comprising sending a message to the robotic device indicating a chromatic quality at which to send the compressed video.

4. The method of claim 1, wherein the computing device receiving the compressed video comprises the computing device receiving a stream of video from the robotic device.

5. The method of claim 4, wherein receiving the stream of video from the robotic device comprises accessing a video stream feed received at a second computing device from the robotic device.

6. The method of claim 5, wherein the video stream feed received at the second computing device comprises an intern& video chat, the intern& video chat comprising video content associated with a real-time interaction between a party at the second computing device and another party.

7. The method of claim 1, wherein the compressed video includes video from a first perspective of the robotic device, and wherein the method further comprises sending a message to the robotic device requesting video from a second perspective of the robotic device.

8. The method of claim 7, further comprising:
extracting still frames from the video from the second perspective of the robotic device; and
processing the still frames of the compressed video from the first perspective of the robotic device and the still frames from the video from the second perspective of the robotic device in a stereoscopic manner.

9. The method of claim 1, further comprising sending a message to the robotic device requesting a second video from the robotic device, wherein the compressed video received from the robot device is captured by a first camera on the robotic device and the second video is captured by a second camera on the robotic device.

10. The method of claim 1, wherein determining the frame rate based on an environment of the robotic device comprises determining bandwidth availability of a channel through which the compressed video is received.

11. The method of claim 1, further comprising:
processing the extracted still frames to determine information associated with the compressed video;
determining a second frame rate at which to extract still frames based on the information associated with the compressed video;
sending a message to the robotic device requesting a second compressed video;
receiving the second compressed video from the robotic device; and
extracting still frames from the second compressed video at the second frame rate.

12. The method of claim 1, further comprising:
receiving information associated with an objective of the robotic device; and
determining the frame rate based also on the objective of the robotic device.

13. The method of claim 1, further comprising:
receiving information associated with capabilities of the robotic device; and
determining the frame rate based also on the capabilities of the robotic device.

14. The method of claim 1, further comprising:
processing the still frames so as to provide a result; and
when the result is inconclusive, sending a message to the robotic device requesting the robotic device to increase a frame rate of the compressed video.

15. The method of claim 1, further comprising:
receiving sensor data from the robotic device, the sensor data associated with one or more sensors on the robotic device; and
determining the frame rate based on the received sensor data from the robotic device.

16. A non-transitory computer readable medium having stored thereon instructions executable by a computing device to cause the computing device to perform functions comprising:
receiving a compressed video from a robotic device;
determining a frame rate at which to extract still frames from the compressed video based on an environment of the robotic device, wherein determining the frame rate based on an environment of the robotic device comprises determining a location of the robotic device; and
extracting still frames from the compressed video at the frame rate.

17. The non-transitory computer readable medium of claim 16, wherein the instructions are further executable by the computing device to cause the computing device to perform functions comprising:
receiving information associated with an objective of the robotic device;
receiving sensor data from the robotic device, the sensor data associated with one or more sensors on the robotic device; and
determining the frame rate based on the objective of the robotic device and on the received sensor data from the robotic device.

18. A device comprising:
a processor; and
memory including instructions stored therein executable by the processor to perform functions comprising:
receiving a compressed video from a robotic device;
determining a frame rate at which to extract still frames from the compressed video based on an environment of the robotic device, wherein determining the frame rate based on an environment of the robotic device comprises determining a location of the robotic device; and
extracting still frames from the compressed video at the frame rate.

19. The device of claim 18, further comprising instructions stored in the memory executable by the processor to perform functions comprising:
processing the extracted still frames to determine information associated with the compressed video;
receiving information associated with an objective of the robotic device;

receiving sensor data from the robotic device, the sensor data associated with one or more sensors on the robotic device;

determining a second frame rate based on the information associated with the compressed video, the objective of the robotic device, and the received sensor data from the robotic device; and extracting still frames from the compressed video at the second frame rate.

* * * * *